(12) United States Patent
Dibble et al.

(10) Patent No.: US 7,496,897 B1
(45) Date of Patent: Feb. 24, 2009

(54) MULTIPLE CODE SETS FOR MULTIPLE EXECUTION CONTEXTS

(75) Inventors: Peter C. Dibble, Bethel Park, PA (US);
Pratik Solanki, Pittsburgh, PA (US);
Ashish G. Karkare, San Jose, CA (US)

(73) Assignee: TimeSys Corporation, Pittsburgh, PA (US)

(*) Notice: Subject to any disclaimer, the term of this patent is extended or adjusted under 35 U.S.C. 154(b) by 1093 days.

(21) Appl. No.: 10/802,386

(22) Filed: Mar. 17, 2004

(51) Int. Cl.
*G06F 9/44* (2006.01)

(52) U.S. Cl. .................. 717/127; 714/39
(58) Field of Classification Search ............. 717/139, 717/148, 110, 117, 118, 124, 127, 131, 137; 718/100, 102, 103, 108; 712/244, 245; 714/38, 714/39

See application file for complete search history.

(56) References Cited

U.S. PATENT DOCUMENTS

| | | | |
|---|---|---|---|
| 5,317,742 A | 5/1994 | Bapat | |
| 5,432,795 A | 7/1995 | Robinson | |
| 5,628,016 A | 5/1997 | Kukol | |
| 5,842,017 A | 11/1998 | Hookway et al. | |
| 5,930,509 A | 7/1999 | Yates et al. | |
| 5,937,193 A | 8/1999 | Evoy | |
| 5,987,529 A | 11/1999 | Nakamura et al. | |
| 6,021,273 A * | 2/2000 | Griesemer ............ | 717/148 |
| 6,038,661 A | 3/2000 | Yoshioka et al. | |
| 6,131,187 A | 10/2000 | Chow et al. | |
| 6,205,491 B1 | 3/2001 | Callsen et al. | |
| 6,226,789 B1 | 5/2001 | Tye et al. | |
| 6,289,446 B1 | 9/2001 | Nilsson | |
| 6,308,318 B2 | 10/2001 | Krishnaswamy | |
| 6,438,573 B1 | 8/2002 | Nilsen | |
| 6,535,903 B2 | 3/2003 | Yates et al. | |
| 6,634,023 B1 | 10/2003 | Komatsu et al. | |
| 6,901,587 B2 | 5/2005 | Kramskoy et al. | |
| 6,954,926 B1 | 10/2005 | Nakamura | |

(Continued)

OTHER PUBLICATIONS

"The Real-Time Specification for Java™," The Real-Time for Java Expert Group http://www.rtj.org, Greg Bollella, et al., The Reference Implementation Team, Doug Locke, et al. (2000).

(Continued)

*Primary Examiner*—Van H Nguyen
(74) *Attorney, Agent, or Firm*—Hamilton, Brook, Smith & Reynolds, P.C.

(57) ABSTRACT

The invention relates to optimizing software code execution during state transitions. The system handles changes in execution context using differential rule checking techniques. For instance, when a thread executing in a data processing system changes state, its new state may be subject to different rules than its previous state. To enforce these rules, the thread may be associated with software code that causes certain restrictions, such as memory restrictions, to be applied to the thread. In an interpretive environment, this can be implemented by detecting a state transition in an active thread, and responding to the state transition by associating the thread with a dispatch table that reflects its state change. The dispatch table may cause the thread to be associated with code that enforces those restrictions. In one example, different dispatch tables can be provided, each table reflecting a different state of a thread, and each causing a thread to be subject to different restrictions. In another example, the same dispatch table can be rewritten to accommodate the changed state of the thread.

17 Claims, 5 Drawing Sheets

U.S. PATENT DOCUMENTS

| | | | |
|---|---|---|---|
| 7,296,257 B1* | 11/2007 | Dibble et al. | 717/127 |
| 2003/0097537 A1 | 5/2003 | Bollella et al. | |
| 2004/0083227 A1 | 4/2004 | Yocom | |
| 2004/0187120 A1 | 9/2004 | Moore et al. | |
| 2005/0267817 A1 | 12/2005 | Barton et al. | |

OTHER PUBLICATIONS

Corsaro, A. and Cytron, R.K., "Efficient Memory-Reference Checks for Real-Time Java*," Dept. Of Computer Science and Engineering, Washington University (2003).

Dibble, Peter C., "Real-Time JAVA Platform Programming," The Sun Microsystems Press JAVA™ Series, pp. 177-225 (2002).

Higuera-Toledano, M. T., "Hardware Support for Detecting Illegal References in a Multiapplication Real-Time Java Environment," ACM Transactions on Embedded Computing Systems, vol. 5, No. 4, pp. 753-772 (Nov. 2006).

Higuera, T., et al., "Region-base Memory Management for Real-time Java," 8 pp. (2001).

Bollella, G., et al., "The Real-Time Specification for Java™," Addison-Wesley, pp. 57-83 (2000).

* cited by examiner

| N/A | This state is unreachable |
|---|---|
| State 1: | No reference or assignment rule checks are required. |
| State 2: | Rules referring to the depths of scopes on the scope stack are not required. |
| State 3: | All assignment rules must be enforced. |
| State 4: | Only the reference rule must be enforced. |
| State 5: | The reference rule and all assignment rules that don't refer to the depth of the scope stack must be enforced. |
| State 6: | The reference rule and all assignment rules must be checked. |

FIG. 3A

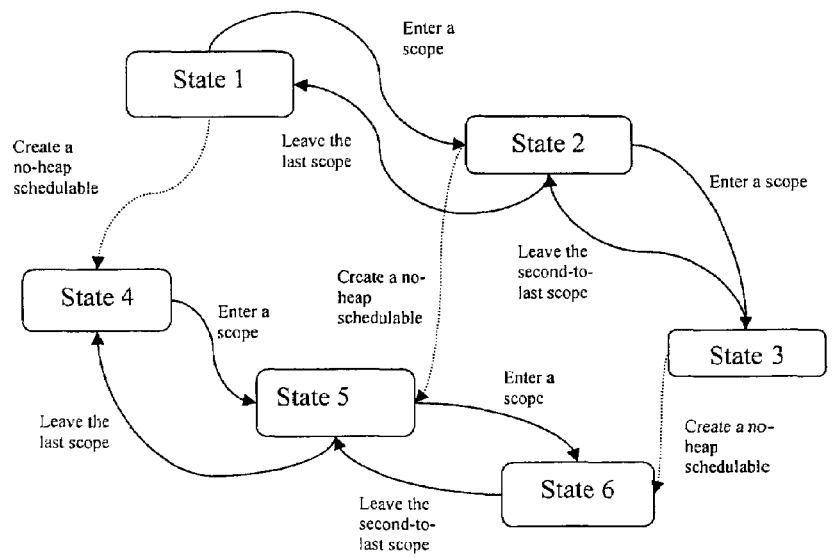

FIG. 3B

MULTIPLE CODE SETS FOR MULTIPLE EXECUTION CONTEXTS

BACKGROUND

Object oriented languages, such as C++ and Java, have emerged as the preferred tools for programmers. These programming languages allow data structures and algorithms to be expressed in a way that is easy to understand and they are able to execute in a predictable way on various computing platforms. The languages have also been widely adopted because of their so-called modularity. Indeed, a major premise for developing the Java language has been to put programmer productivity before any other concern, as eloquently captured in the now famous Java slogan, "Write Once, Run Anywhere".

Java is a widely used programming language due to the machine independent nature of bytecodes. In addition to portability, both security and ease of development of applications have made Java very popular with the software community. Since the specifications offer substantial flexibility in the implementation of the Java virtual machine, a number of techniques have been used to execute bytecodes. The most commonly used modes of execution are interpretation, a mode that interprets the bytecodes, and just-in-time compilation, a mode that dynamically translates bytecodes to native code at runtime. A recent development has been the hybrid execution engine, which uses interpreters, adaptive just-in-time compilers, ahead-of-time compilers and profile-based feedback to interpret/compile bytecodes. Other possible modes include hardware execution of bytecodes.

In the Java execution model, each source code class is compiled to the Java virtual machine class file format and methods are compiled into a fully portable standard bytecode representation. To execute a program operation, such as a method or a function, the virtual machine translates its bytecode instructions into an execution sequence of (hardware) machine code. The translation of a bytecode instruction typically involves accessing the arguments of the instruction, implementing the function of the instruction, and dispatching (fetching, decoding and starting) the next instruction.

Java interpreters are generally highly portable and rapid to implement. They are considerably smaller and simpler than just-in-time compilers, and this makes them quicker to develop, less expensive to maintain and potentially more reliable. The problem with existing interpreters, however, is that they run most code slower than compilers.

Just-in-time compilers interact with the virtual machine at run time and compile appropriate bytecode sequences into native machine code. Through just-in-time compilation, a bytecode method is translated into a native method on the fly, so as to replace (probably repeated) interpretation overhead with (probably one-time) compilation overhead. Unlike a traditional compiler, in which compile time is often ignored, a just-in-time compiler needs to produce code rather quickly. This typically requires optimization algorithms to be small and efficient.

An adaptive just-in-time compiler monitors execution and modifies the code to keep it correct and to optimize it. In particular, adaptive compilation allows inlining to be used extensively where the targets of most method calls cannot be determined at compile time, even when compilation is just-in-time. Under an adaptive just-in-time compiler, code may be recompiled many times as the compiler optimizes the code or adapts it to changing conditions.

Combined with execution profiling, a just-in-time compiler can dramatically increase the execution speed of Java programs by adapting the code to changing conditions. Execution profiling may occur during the execution of the bytecode. The runtime system or virtual machine connects a profiler to a process during process initialization. The profiler receives notifications each time that a function is entered or exited, as well as when other events occur that are of interest. By gathering statistics on these events, a profiler can build a comprehensive picture of which routines used the most CPU time, when garbage collections occurred, if exceptions were thrown, and the like. Profiling the program's behavior during execution can assist the virtual machine in identifying paths for optimization, such as which code is likely to be subject to heavy use. This code can be pre-compiled and cached by an ahead-of-time compiler to reduce runtime overhead.

Although just-in-time compilers eliminate interpretation overhead, they are typically considered inappropriate in the context of real-time systems because the overall execution time of the code increases. Real-time applications are those for which timeliness, that is, the ability to guarantee that an event will occur at a suitable time, needs to be guaranteed. The real-time Java platform dictates that the worst-case performance of a method must meet specified timing constraints. This means that a just-in-time or adaptive just-in-time compiler only benefits real-time applications if its impact can be isolated to places where real-time constraints are relaxed. If compilation takes place during a time-critical interval, it will almost certainly increase the execution time for that code compared to a simple interpreter. Consequently, the benefits of just-in-time compilation in real-time systems do not outweigh the increase in execution overhead.

Certain emerging real-time standards, such as the Real-time Specification for Java (RTSJ), have been designed to provide real-time programming features for the Java environment. The RTSJ, for instance, extends the Java memory model by providing memory areas other than the heap. These memory areas are often characterized by the lifetime of the objects created in them, as well as the time taken for their allocation.

The RTSJ provides different classes of memory, including immortal memory, scoped memory and heap memory. Immortal memory is a memory resource that is shared among schedulable objects and is not normally subject to garbage collection. Objects allocated in immortal memory exist until the application terminates. Unlike the standard Java heap, immortal objects continue to exist even after there are no other references to them. Scoped memory is a class of memory dealing with representations of memory spaces with a limited lifetime. The scoped memory area is valid as long as there is a schedulable object with access to it. Scoped memory is also free from garbage collection. The RTSJ supports the normal types of memory, including heap memory and local variables.

The RTSJ uses assignment and reference checks that are applied to scoped and immortal memory regions in order to maintain referential integrity in the Java environment. These assignment and reference checks ensure memory safety by, among other things, preventing schedulable objects from interfering with the garbage collector and avoiding dangling references. Some memory reference checking can be performed at compile time by pointer escape analysis. Due to the unpredictable nature of schedulable objects, however, some checks need to be performed at runtime.

Assignment checking prevent the creation of dangling references by forbidding assignments that could cause a field of an object to point to an object with a shorter lifetime. The RTSJ permits references to objects in heap or immortal memory to be stored in any class of memory. A scope memory object, therefore, can reference objects in the heap. The garbage collector typically ensures that objects in the heap survive at least as long as references to those objects. Objects in a scope are freed when the scope is no longer active. If an object in heap or immortal memory were permitted to hold a reference to an object in a scoped memory location, that reference would become invalid once the scope is exited. Consequently, objects in heap or immortal memory cannot contain references to scope memory areas. Runtime checks of scoped memory references can be performed to enforce the rules.

The following is a set of assignment checking rules that apply to scoped memory area objects:

1. A reference to an object in scoped memory cannot be stored in an object that is allocated in the heap.
2. A reference to an object in scoped memory cannot be stored in an object that is allocated in immortal memory.
3. A reference to an object in scoped memory can only be stored in objects that are allocated in the same scoped memory area or to a more "inner" scope memory area.
4. References to immortal or heap objects may be stored in an object that is allocated in a scoped memory area.

These rules can be enforced if the Java virtual machine implements several logical rules when storing object references, as explained in Table 1.

TABLE 1

|  | Reference to Heap | Reference to Immortal | Reference to Scope |
| --- | --- | --- | --- |
| Heap | Yes | Yes | No |
| Immortal | Yes | Yes | No |
| Scope | Yes | Yes | Yes, if same or outer scope |
| Local Variable | Yes | Yes | Yes, if same or outer scope |

The RTSJ also extends the Java thread model to include additional schedulable classes: real-time threads, no-heap real-time threads, and async event handlers (which may choose to operate without access to the heap). These classes are collectively called schedulable objects. No-heap real-time threads and no-heap async event handlers can preempt the garbage collector. The RTSJ does not allow a no-heap domain to load or store a reference to an object in the heap. It can, however, replace references to the heap with references to no-heap objects or null. If the reference to the heap is not handled appropriately, garbage collection on the heap object may be delayed.

There are various approaches used to implement assignment and reference checks. A just-in-time compiler, for example, may be used to generate code that determines the state of a schedulable object before each schedulable object-state-dependent operation. As discussed above, however, just-in-time compilers may be impractical in resource-constrained environments. Another approach involves requiring all schedulable objects to generate their own code for reference checking. No-heap real-time threads, for instance, can be designed to generate code for no-heap reference checking. This code generation, however, can result in substantial processing overhead.

Another technique uses the Java virtual machine to verify compliance with the rules at each bytecode instruction that stores an object reference. This runtime checking usually involves first determining which tests are applicable to the state of the schedulable object executing the byte code, then inspecting the arguments as appropriate for the domain, and if the operation violates a rule, throwing an illegal assignment error exception, or a reference error. Unfortunately, as with the other techniques, this approach causes excessive processing overhead.

Yet another approach uses a trusted compiler to verify the correctness of assignment operations. In a dynamically bound, multi-threaded environment, however, only a runtime test can catch all possible violations of memory assignments, since any number of schedulable objects may be active in a section of code at a given time. Thus, most rule checking needs to occur at runtime, which causes degraded performance.

Efficient translation/execution in a resource-constrained environment remains a fundamental problem in the field. High levels of runtime checking and exception processing overhead can significantly degrade application responsiveness and determinism. Minimizing this overhead is therefore an important goal of a real-time system.

SUMMARY OF THE INVENTION

The present system and method relate to a scheme for optimizing program translation and execution. The invention provides a mechanism for handling a state transition of a thread executing in a data processing system. The system responds to the change in execution context by causing the thread to be associated with a mechanism that is capable of handling its state transition. Depending on the change in state, certain assignment and reference checks may be applied to the schedulable object.

When a state transition is detected, the previous execution state of a schedulable object is determined and stored. The system may respond to the change in the execution context by causing the schedulable object to be interpreted using a set of instructions that are capable of handling the change. The instructions may be fetched using a dispatch table. The dispatch table may include one or more addresses. Each address may be associated with a starting location for code associated with an instruction to be interpreted.

In one embodiment, the system may respond to the state transition by causing the schedulable object's dispatch table to be rewritten to reflect the change in execution context. One or more addresses included in the dispatch table may be modified so that the rewritten locations point to code capable of handling the change in execution context.

In another embodiment, several versions of dispatch tables may be provided. Each version may be predefined or dynamically defined at runtime, each representing a unique execution context. When a change in the schedulable object's execution context is detected, a dispatch table is selected from a library of dispatch tables. The selected dispatch table reflects the change in execution context. It points to instructions capable of handling the rules appropriate to the new execution context.

The change in execution context may occur when the schedulable object enters a certain memory area. The memory area may be a specific object allocation domain, such as heap, immortal or scoped memory regions. If, for instance, a no-heap real-time thread executing in immortal memory changes state by entering a scoped memory, the thread may be interpreted using an instruction set that is capable of enforcing the rules appropriate to a no-heap thread in a scoped memory. The relevant code set may be fetched using dispatching techniques, such as direct threading, indirect threading, switching or inlining. A dispatch table, for example, may be used to map the schedulable object to an instruction set that handles the change in state. The instruction set may be capable of handling one or more of the following execution states of the schedulable object: an unreachable state, a state in which reference or assignment rules are not required, a state in which assignment rules (except those that refer to a depth of a scope stack) are enforced, a state in which all assignment rules are enforced, a state in which only reference rules are enforced, a state in which reference and assignment rules (except those that refer to a depth of a scope stack) are enforced, or a state in which all reference and assignment rules are checked.

In determining the execution context of the schedulable object, the system may consider the type of schedulable object and its associated memory region. For example, the software system may determine whether the schedulable object is a no-heap real-time thread, and, if it has any scopes on the scope stack (and, if so, whether the scope stack contains more than one scope).

Each execution context may be associated with a corresponding instruction set. Each execution context may also be associated with a corresponding address or jump instruction that directs an interpreter to a particular instruction set. Each execution context may also be associated with a corresponding dispatch table, which includes jump instructions to the instruction set. The dispatch table may be a bytecode vector table or opcode vector table that identifies the address of the instruction set. The instruction set may be bytecode instructions or precompiled code, i.e. machine code.

The instruction set may include logic for performing assignment or reference checking. If, for instance, the schedulable object is a real-time thread with only one scoped memory on the stack, the instructions may direct the runtime environment to monitor scoped versus heap/immortal assignments, but not enforce the rules that relate to the depth of the scope stack. If there are more than one scope on the stack the instructions must enforce rules related to scope stack depth, for instance, by directing the runtime environment to determine the position of the scope on the thread's scope stack, by "walking" the stack representing the Directed Acyclic Graph (DAG), and counting entries until the scope is located. The count then indicates the depth of the reference. In another example of a mechanism for enforcing the depth-related assignment rules, the instructions implement assignment rules for scope memory objects to determine the order in which scopes appear on an active schedulable object scope stack, without actually traversing a scope stack. If there is a violation of any of the reference or assignment checking rules, the instructions may cause an exception to be thrown.

The software system may use several different modes of execution for processing the schedulable object. The system may rely on interpretation and just-in-time compilation. Other possible modes include hardware execution of bytecodes and ahead-of-time compilation of bytecodes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A-B depict various execution contexts that may require assignment and reference checks.

DETAILED DESCRIPTION OF THE INVENTION

Figure 1:
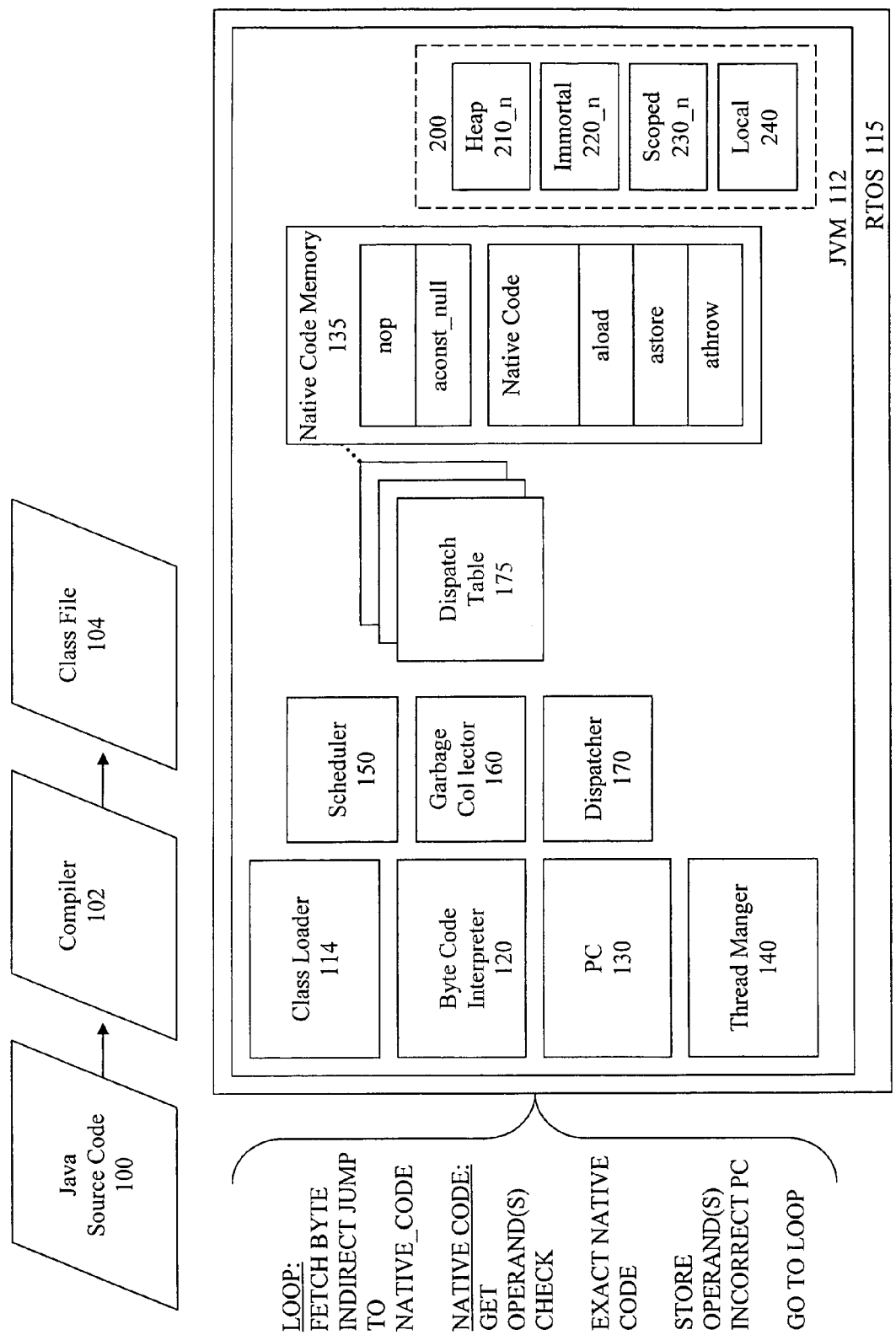
FIG. 1 depicts an interpretive environment according to an embodiment of the invention.

A description of preferred embodiments of the invention follows.

System Architecture

Preferably, the invention is implemented in a real-time software or hardware environment. The real-time software or hardware environment works with the Real-Time Operating System (RTOS) and uses a Java virtual machine (JVM) to translate Java bytecodes into the native language of the system's processor. One such environment using an interpreter 120 is shown in FIG. 1.

The compiler 102 translates Java source code 100 into a class file 104. When the class loader 114 loads the class file 104, it receives a stream of bytecodes for each method in the class. The bytecode streams are stored in the method area of the JVM 112. The bytecodes for a method are executed when that method is invoked during the course of running the Java program. They can be executed by an interpreter 120, just-in-time compiler, ahead-of-time compiler, or any other technique compatible with the JVM 112.

A method's bytecode stream is a sequence of instructions for the JVM 112. Each instruction consists of an opcode followed by zero or more constant operands. The opcode indicates the operation to take. If more information is required before the JVM 112 can perform the operation, that information is encoded into one or more constant operands that follow the opcode. Other operands are found on the operand stack. Opcodes are executed sequentially and stored as eight-bit numbers. Operands vary in length, but all may be divided into bytes. The JVM 112 enforces sizes for bytecode commands and symbolic operand address references. However, object reference assignments to or from various memory areas within the JVM 112 are preferably resolved at runtime. Thus, the specific restrictions required to limit references between various combinations of heap 210_n, immortal 220_n, scoped 230_n, and local variable memory 240 are enforced by the bytecode interpreter 120.

Various components of a JVM 112 are also shown in FIG. 1. These components include a class loader 114, the bytecode interpreter 120, a thread manager 140, a scheduler 150, garbage collector 160, a dispatcher 170, emulation code memory 135 and application data memory 200 including heap memory 210_n, immortal memory 220_n, scoped memory 230_n and local memory 240_n areas.

The interpreter 120 is able to locate pieces of native code 135 using the bytecodes assigned by the compiler 102. More specifically, at runtime, the class loader 114 loads the class file into a buffer. Its components are digested into the internal data structures that reflect the data defined by the class file, the constants used by it, the classes in it, and the methods in it. Thus, to the extent that the class file makes use of various portions of memory 200 including the heap 210_n, immortal memory 220_n, and scope memory 230_n, initial allocations of these may be made by the class loader 114. A verifier is then run over the class that proves that the bytecodes within the class obey various initialization rules. For example, the verifier will not permit the JVM 112 to load a class that includes code, which uses uninitialized data. Before the first use of the class, the class loader 114 also initializes static data for classes.

The bytecode interpreter 120 is then able to begin execution of the loaded methods, one bytecode at a time. Specifically, bytecode interpreter 120 executes as a logical loop, as illustrated in the pseudo code description to the left of the block diagram. As shown, the interpreter 120 first fetches a bytecode, as pointed to by the current contents of a program counter (PC) 130. The bytecode, and specifically the opcode portion of the fetched bytecode, is then used to perform a lookup in a dispatch table 175. The dispatch table 175 contains entries that point to locations in the native code memory (e.g. cache) 135. The interpreted bytecode thus causes a jump to the native emulation code associated with a particular bytecode. For example, in the case of bytecode zero, the dispatch table 175 points to the instruction emulation code 135 for a nop. In the case of bytecode 1, the dispatch table points to the code for an aconst_null. Similarly, other bytecodes, such as athrow, point to native code for exception throwing instructions. Further examples of bytecodes, such as aload, point to native code for loading references. Bytecodes such as astore point to native code for storing references.

Native code section 135 contains appropriate target machine native instructions for executing each Java bytecode. These depend upon each specific instruction being implemented but may generally include, for example, code to fetch operands, execute particular instruction logic, store results and then increment the program counter 130 prior to returning.

A garbage collector 160, which is not technically required by Java, helps remove execution restrictions. The impact of garbage collection on real-time performance is enough to motivate facilities for time-critical applications that limit the use of memory to scope 230_n and/or local memory portions 240. For example, a garbage collector 160 may perform, on request or on demand, background garbage collection tasks on heap memory.

A thread manager 140 manages the notion of concurrency of threads (multithreading). By the term "threads", what is meant herein is the data for an execution context, that is, a set of registers, a processor stack, and a Java stack. The thread manager 140 creates and recovers threads. It may, for instance, maintain a pool of preallocated and unused threads. The dispatcher 170 switches control from one thread to another (such as when there are not enough physical processor resources to run all of them at the same time), while the scheduler 150 determines when to run each thread and at any particular instant in time. The mechanism that supports multiple threading can be included in underlying RTOS 115 or can be implemented in a library that is directly linked to the JVM 112.

Memory Areas

Each schedulable object maintains a stack of memory areas, such as scoped memory 230_n, immortal memory 220_n and heap memory 210_n. This is, at least conceptually, different from the schedulable object's call stack which stores stack stores frames, which are created each time a method is invoked. A call stack frame consists of an operand stack, an array of local variables, and a reference to the runtime constant pool of the class of the current method. The memory area on the top of the stack stack of memory areas is the schedulable object's default allocation context. If the schedulable object creates a new object, it is allocated in the default allocation context unless the schedulable object explicitly specifies that the object should be allocated in some other memory area. When the schedulable object calls a memory area's enter method, the default allocation context for that schedulable object switches to that memory area. The default allocation area may change back when the schedulable object returns from its enter method.

Schedulable objects can enter and exit memory areas. When a schedulable object enters a memory area, it pushes the area onto its scope stack. When it exits the memory area, it pops the area from the stack. In general, there are two ways to enter a memory area or sequentially execute a run method that executes in the memory area: i) spawn a parallel schedulable object whose initial stack contains the memory area, or ii) sequentially execute a run method that executes in the memory area. The schedulable object exits the memory area when the run method returns.

There is a third way to change memory areas that is not strictly "entering" it. The executeInArea mechanism moves the current allocation context to a memory area that is already on the schedulable object's scope stack when it is called and returns to the previous memory area on return. The executeInArea method does not add a new memory area to the scope stack, but only moves the current allocation context to another memory that is already on the scope stack.

Rule Checking

The RTSJ has access rules for no-heap schedulable objects. The RTSJ also has rules that govern the storage of references to objects in heap, immortal, and scoped memory. These rules are placed on assignments to and from different memory areas. These rules are performed to maintain Java safety, avoid memory leaks and prevent the creation of dangling pointers.

Figure 2A:
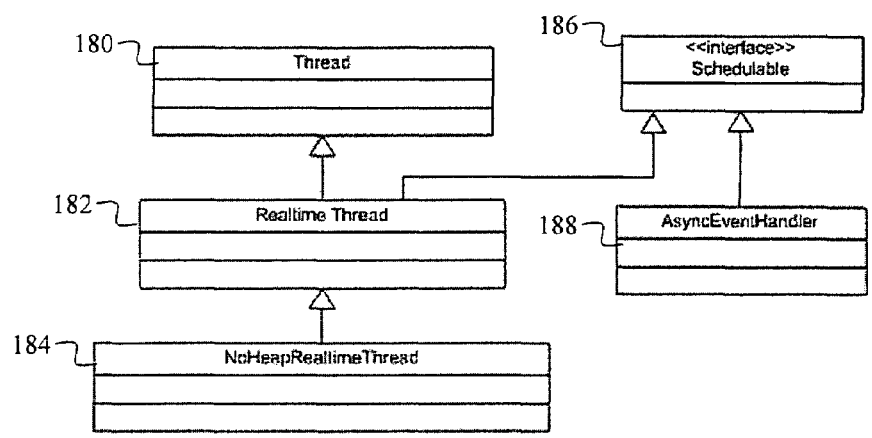
FIG. 2A depicts an example of a class hierarchy in the RTSJ thread model.

FIG. 2A depicts an example of the RTSJ thread class hierarchy. The RTSJ provides three schedulable objects. These objects are instances of the RealtimeThread 182, NoHeapRealtimeThread 184 and AsyncEventHandler 188 classes. The RealtimeThread 182 class is a subclass of the Thread class 182, and the NoHeapRealtimeThread class 184 is a subclass of the RealtimeThread class 182.

The RTSJ provides specific memory restrictions for the NoHeapRealtimeThread 184 class. A NoHeapRealtimeThread 184 object is not allowed to reference or access objects on the heap. If an instance of the NoHeapRealtimeThread 184 class references the heap, a MemoryAccessError exception is thrown.

Figure 2B:
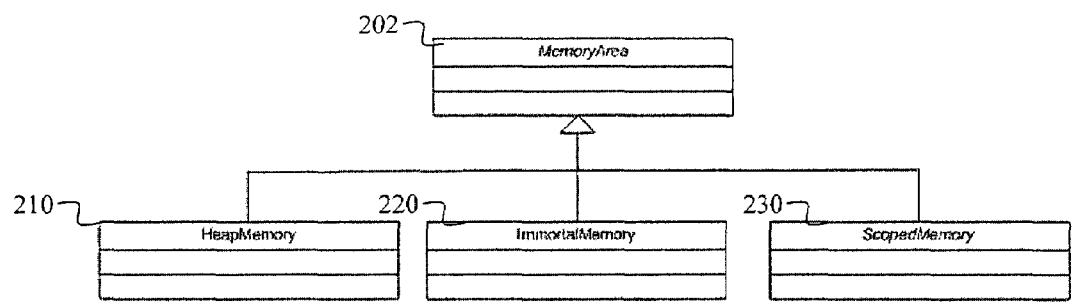
FIG. 2B depicts an example of a class hierarchy in the RTSJ memory model.

FIG. 2B depicts an example of a class hierarchy in the RTSJ memory model. MemoryArea 202 is the abstract base class of classes dealing with representations of allocatable memory areas. HeapMemory 210 is a singleton object and objects associated with the heap are subject to garbage collection. ImmortalMemmory 220 is a singleton object, which provides a memory resource that is shared among schedulable objects. An ImmortalMemmory 220 object may contain references to other immortal objects or to heap objects.

The ScopedMemory 230 class is an abstract base class for all classes dealing with representations of memory space with a stack-like limited lifetime. As listed in Table 1 above, scoped memory is subject to the following rules: i) a scoped memory objects cannot be stored in an object allocated in the heap; ii) a reference to an object in scoped memory can not be stored in an object allocated in immortal memory; and iii) a reference to an object in scoped memory can be stored in objects allocated in the same scope or in a more inner scope. Preferably, the depth of the scope is determined using the technique described in U.S. patent application Ser. No. 10/684,334, filed Oct. 10, 2003, the entire teaching of which are incorporated herein by reference.

The RTSJ states that scopes can be nested and that inner scopes, by definition, have a shorter lifetime than outer scopes. Memory areas can be nested as long as they follow the so-called single parent rule. A detailed discussion of the single parent rule and Real-time Java concepts are given at length in "Real-time Java Platform Programming" by Dibble, P. C., Sun Microsystems Press 2002.

A scoped memory area is activated for allocation by its enter method and becomes inactive when the enter method returns. When it is used this way, the scoped memory is a nested scope. Usually, the scope's enter method throws a ScopedCycleException if it is called on a memory area that any schedulable object has already entered from a different scope. Consequently, an object from an outer scope may not reference an object from within an inner scope. This restriction is required to prevent the state of the referencing object from becoming inconsistent. Similarly, an object on the heap may not reference objects anchored in ScopedMemory 230. Due to these restrictions, internal pointer assignments need to be checked.

To implement this rule checking, conventional schemes require checking at every store and load related bytecode and at every method invocation/return bytecode. Illegal accesses checks, for example, are performed when executing instructions that load references within objects or arrays. This requires checking every time the JVM loads or stores a reference. The present invention, however, eliminates the need for rule checks at every store and load related bytecode and method invocation/return byte codes. Instead, the invention implements rule checks dependent on the current state of the schedulable object.

State Transitions

In connection with the present invention, the Java runtime environment detects a change in state in an active schedulable object and responds by associating the schedulable object with an appropriate mechanism that can handle the change in state. Various memory assignment and reference checks may be performed when a schedulable object changes state. Referring to FIG. 1, the interpreter 120 can be used to implement assignment and reference checks, which cannot be checked at load time. The relevant assignment and reference checks are applied to schedulable objects that are changing state (execution context).

FIGS. 3A-B show the various execution contexts that may require assignment and reference checks. During the execution of a schedulable object, the schedulable object may change its execution context. For example, the schedulable object may create a new object allocated in a memory area other than its default memory area, and as a result there may be a change in schedulable objects execution context.

Each type of schedulable object and memory area may have a specific execution context, which requires certain assignment or reference rules. Table 2 shows the various states associated with specific types of schedulable object execution contexts and associated memory regions.

TABLE 2

| | Plain Thread | Real-time Schedulable Object | No-Heap Schedulable Object |
|---|---|---|---|
| No scoped memory | State 1 | State 1 | State 4 |
| One Scope on Stack | N/A | State 2 | State 5 |
| More than one Scope on Stack | N/A | State 3 | State 6 |

As shown in FIGS. 3A-B, in state 1 assignment and reference checks are not enforced. In this state, the object may be an ordinary Java thread, which is not subject to the RTSJ memory restrictions. The object could alternatively be an instance of the RealtimeThread class allocated in either heap or immortal memory area, without any scopes on the scope stack. The RTSJ allows immortal memory objects to contain references to the heap. Likewise, RTSJ permits heap memory objects to contain references to immortal memory. Thus, a schedulable object that only has access to heap and immortal objects, and which can not reference or allocate in scoped memory, is not subject to the RTSJ memory restrictions.

In state 2, assignment rules that do not relate to the depth of the scope stack are enforced. This execution context relates to an instance of the RealtimeThread class with one scope on its scope stack. The relevant assignment checks include checking for assignments that could cause the real-time thread to point to an object with a shorter lifetime.

At state 3, all assignment rules are enforced. This execution context relates to an instance of the RealtimeThread class with two or more scopes on the scope stack. Because the thread has two or more scopes on the scope stack, the assignment rules concerning the depth of the scope are enforced.

In state 4, the reference rule is enforced. This execution state relates to an instance of the NoHeapRealtimeThread class that does not have any scopes on the scope stack. The reference rule requires checks to ensure that the no-heap schedulable object neither enters the heap nor contains a reference to a heap object. This rule ensures that the execution of the thread does not lead to an inconsistent heap state.

In state 5, the reference rule and assignment rules that do not relate to the depth of the scope stack are enforced. In this execution context, the object is a member of NoHeapRealtimeThread class with one scope on the stack. Reference checks are performed to ensure that the thread does not access or reference the heap. Assignment checks are performed to ensure that the no-heap thread does not point to an object with a shorter lifetime.

In state 6, all reference rules and assignment rules are enforced. In this execution context, the object is a member of the NoHeapRealtimeThread class with two or more scopes on the scope stack. The thread is checked to ensure that it does not access or reference objects in the heap. All scope memory assignment rules set forth in Table 1 above are also enforced to ensure that the thread does not point to another object with a shorter lifetime.

Preferably, each execution context is associated with a corresponding bytecode vector table. In one example, each of the six states is associated with a respective vector table, which points to code that may implement assignment or reference checks. In another example, a per-thread vector table may be patched so that entries in the table are altered to better suit the thread state. In this way, execution at state transitions can be optimized by using an appropriate dispatch table that reflects the change of state. Similar techniques that relate to exception handling are described in U.S. application Ser. No. 10/211,933, and filed Aug. 1, 2002, the entire teachings of which are incorporated herein by reference.

In one implementation of the invention, each object may include a memory state field that stores a value indicating the object's execution context. When an object is initialized, the field can have a default value associated with the object's class. An instance of the Thread class or RealtimeThread class, for example, may include a default value of 1, which identifies "state 1". An instance of the NoHeapRealtimeThread class may include a default state value of 4, which identifies "state 4". When a thread has changed state, its memory state value can be updated to identify the value associated with its new state.

Figure 4:
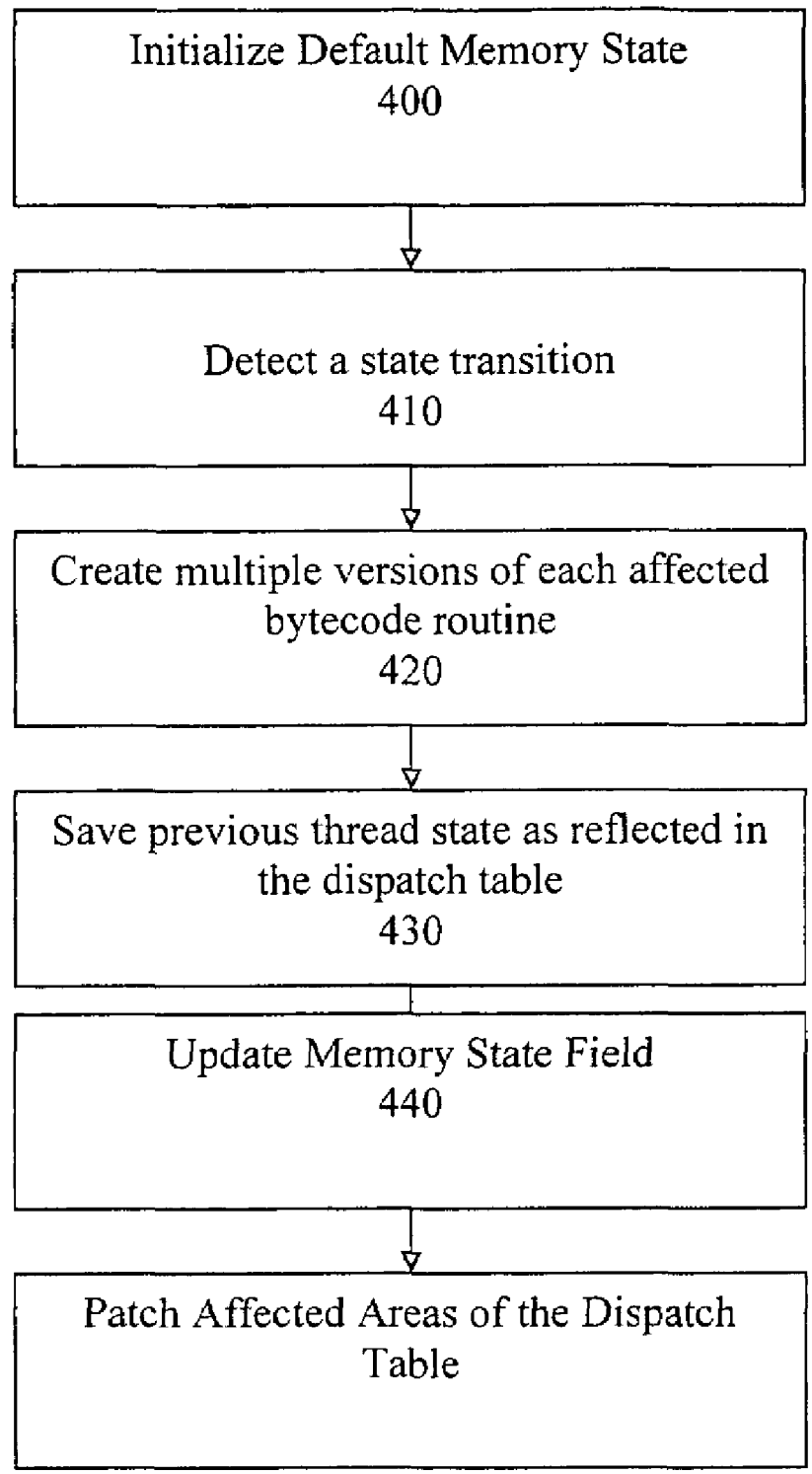
FIG. 4 depicts a process of modifying the bytecode vector table at state transitions according to an embodiment of the invention.

FIG. 4 is a flow diagram illustrating the process of modifying the bytecode vector table at state transitions according to an embodiment of the invention. A thread is initialized with a default memory state value at 400. When a state transition is detected at 410, then multiple versions of each affected bytecode routine are created at 420. At 430, the thread's previous state is saved as reflected in the bytecode vector table. At state 440, the thread memory state field is updated to reflect the change in state. At 450, the bytecode vector table is modified so it causes further processing of the thread to be subject to appropriate assignment or reference checking, if any.

Execution Engine

It should be noted that although the invention is described as being implemented in an interpretive environment, this is merely one possible implementation. There are many types of execution engines in the art that can be used to implement the invention. For instance, pre-compiler, preprocessor, just-in-time compiler (preferably adaptive just-in-time) and hybrid execution engines may be used. The execution engine may be implemented in software or hardware. For instance, a just-in-time compiler can fetch and decode bytecodes in hardware and execute using the CPU data path.

Figure 5:
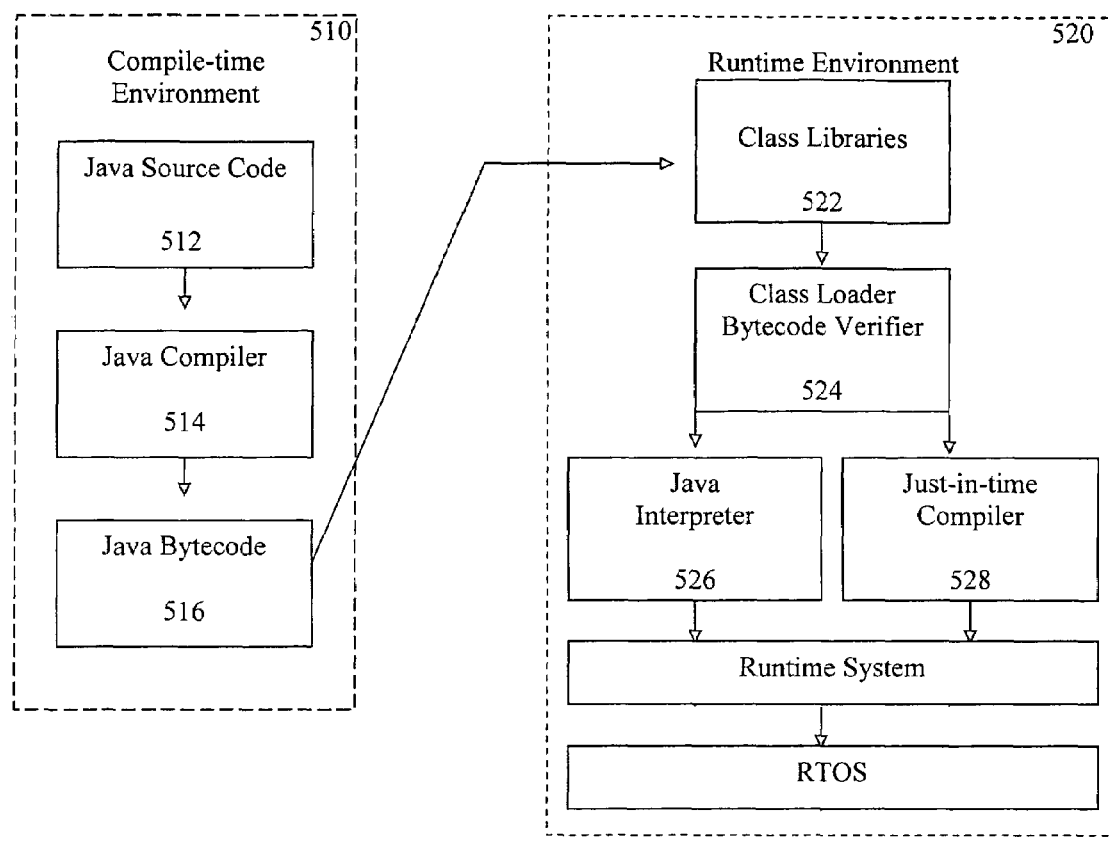
FIG. 5 depicts a hybrid execution environment according to an embodiment of the invention.

FIG. 5 shows an example of a hybrid execution environment according to an embodiment of the invention. Compile-time 510 and runtime environments 520 are shown. In the compile-time environment 510, each source code class 512 is compiled by the compiler 514 to the Java virtual machine class file format and methods are compiled into a fully portable standard bytecode representation 516. The source code class files 512 may be dynamically compiled. The runtime environment includes, among other things, class loader/bytecode verifier 524, interpreter 526 and just-in-time compiler 528.

Dispatching Techniques

There are various types of dispatch techniques, such as switching, direct threading, indirect threading and inline threading that may be used in connection with the invention. In switching, for example, operations are looked up in a table in order to identify the address of the corresponding native subroutine. In direct threading, the instructions of a program are replaced with the addresses of a routine that implements them. During instruction dispatch, the address of an instruction routine is fetched and the program calls the corresponding routine. In indirect threading, encoding operations are used as pointers to locations that hold the actual address. Inline threading involves identifying instruction sequences within the code array, dynamically creating a new implementation for the sequence and copying the implementation into a buffer. Those skilled in the art will understand that such dispatching techniques, among others, are compatible with the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method, performed by a computer system, for providing a dispatch table that reflects an execution context of computer readable instructions, the method comprising:
   determining an execution context for computer readable instructions;
   responding to a change in the execution context by using the dispatch table which reflects the change;
   wherein the execution context for the instructions corresponds to the execution context of a thread executing in a data processing system, the thread being a real-time thread that is a schedulable object;
   wherein if the thread is a real-time thread, the execution context of the thread is one of: a real-time thread with no scope on a scope stack; a real-time thread with at least one scope on a scope stack; a no-heap real-time thread with no scope on a scope stack; or a no-heap real-time thread with at least one scope on the stack;
   wherein each execution context is associated with a corresponding dispatch table; and
   wherein determining a change in execution context includes:
      determining that the execution context of the thread has changed; and
      responding to the change by causing the thread to be associated with a dispatch table reflecting the change.

2. The method according to claim 1 wherein the dispatch table includes one or more addresses, each address associated with a starting location for code associated with an instruction to be interpreted.

3. The method according to claim 2 wherein using a dispatch table which reflects the change in execution context further includes rewriting one or more entries of the dispatch table so that the rewritten locations point to code capable of handing the change in execution context.

4. The method according to claim 2 wherein using a dispatch table which reflects the change in execution context further includes selecting a predefined dispatch table having one or more addresses that point to code capable of
   handing the change in execution context.

5. The method according to claim 4 wherein the predefined dispatch table is selected from a library of predefined dispatch tables, where each dispatch table in the library reflects a specific execution context.

6. The method according to claim 1 wherein determining a change in execution context further includes checking one or more memory references.

7. The method according to claim 1 wherein the dispatch table reflecting the change in execution context is capable of managing one of the following execution states of the thread:
   unreachable state;
   state in which reference or assignment rules are not required;
   state in which all assignment rules are enforced;
   state in which only reference rules are enforced;
   state in which reference and assignment rules, except those that refer to a depth of a scope stack, are enforced; or
   state in which all reference and assignment rules are checked.

8. The method according to claim 1 wherein determining the execution context further includes:
   checking one or more memory references; or
   checking one or more memory assignments.

9. The method according to claim 8 wherein the memory references and the memory assignments are allocated from at least one of the following:
   scope memory, heap memory or immortal memory.

10. The method according to claim 8 wherein checking memory references further includes detecting a change in execution context when there are at least two references to scoped memory areas on a scope stack.

11. The method according to claim 1 further includes storing a previous execution context of the thread as reflected in the dispatch table before the change.

12. The method according to claim 10 further includes in response to the thread returning to a previous execution context, causing the thread to be associated with the stored dispatch table.

13. The method according to claim 1 wherein using a dispatch table reflecting the change in execution context causes the instructions to be interpreted using memory reference checking rules or memory assignment checking rules.

14. The method according to claim 13 further including throwing an exception if there is a violation of any of the reference or assignment checking rules.

15. The method according to claim 1 wherein the dispatch table is used to implement the instructions into machine executable code.

16. The method according to claim 1 wherein a bytecode interpreter causes the dispatch table to reflect the change in execution context.

17. The method according to claim 1 wherein the dispatch table is any one of: a bytecode vector table or opcode vector table.

* * * * *